United States Patent
Liu et al.

(10) Patent No.: US 10,511,356 B2
(45) Date of Patent: Dec. 17, 2019

(54) MULTI-ANTENNA NETWORK SYSTEM AND SIGNAL PROCESSING METHOD THEREOF

(71) Applicants: Alpha Networks Inc., Hsinchu (TW); Industrial Technology Research Institute, Hsinchu (TW)

(72) Inventors: Chia-Lung Liu, Hsinchu (TW); Dong-Shing Wu, Hsinchu (TW); Ren Hao Chen, Hsinchu (TW)

(73) Assignees: ALPHA NETWORKS INC., Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 163 days.

(21) Appl. No.: 15/822,583

(22) Filed: Nov. 27, 2017

(65) Prior Publication Data

US 2019/0103901 A1 Apr. 4, 2019

(30) Foreign Application Priority Data

Oct. 2, 2017 (TW) .............................. 106134095 A

(51) Int. Cl.
| | | |
|---|---|---|
| *H04W 72/04* | (2009.01) | |
| *H04B 7/0413* | (2017.01) | |
| *H04L 25/02* | (2006.01) | |
| *H04B 7/0404* | (2017.01) | |
| *H04B 7/0456* | (2017.01) | |
| *H04W 88/08* | (2009.01) | |

(52) U.S. Cl.
CPC ......... *H04B 7/0413* (2013.01); *H04B 7/0404* (2013.01); *H04B 7/0456* (2013.01); *H04L 25/0202* (2013.01); *H04L 25/0244* (2013.01); *H04W 72/0406* (2013.01); *H04W 88/08* (2013.01)

(58) Field of Classification Search
CPC .. H04B 7/0413; H04B 7/0404; H04B 7/0456; H04W 72/0406; H04W 88/08; H04L 25/0202
See application file for complete search history.

(56) References Cited

U.S. PATENT DOCUMENTS

| | | | |
|---|---|---|---|
| 7,376,192 B2 * | 5/2008 | Koorapaty | ........... H04B 7/0626 375/259 |
| 8,599,677 B2 * | 12/2013 | Li | ...................... H04B 1/71052 370/209 |
| 9,313,002 B1 | 4/2016 | Balraj | |
| 2005/0085197 A1 * | 4/2005 | Laroia | ...................... H01Q 3/24 455/101 |

(Continued)

FOREIGN PATENT DOCUMENTS

| | | |
|---|---|---|
| CN | 106059645 | 10/2016 |
| CN | 106533521 | 3/2017 |

(Continued)

*Primary Examiner* — Hoang-Chuong Q Vu
(74) *Attorney, Agent, or Firm* — WPAT, PC

(57) ABSTRACT

A multi-antenna network system has a reduced operational complexity for matrix inversion by referring to the variations of the status of a plurality of communication channels at a first time duration and a second time duration. Therefore, the speed for calculating matrix inversion is improved. Accordingly, the amount of servo antennas and/or user antennas operating in the same multi-antenna network system can be increased.

13 Claims, 5 Drawing Sheets

(56) References Cited

U.S. PATENT DOCUMENTS

| | | | |
|---|---|---|---|
| 2008/0080459 A1* | 4/2008 | Kotecha | H04B 7/0417 370/342 |
| 2009/0268810 A1 | 10/2009 | Dai | |
| 2009/0316591 A1* | 12/2009 | Reial | H04L 1/0023 370/252 |
| 2010/0008406 A1* | 1/2010 | Sawai | H04L 25/03006 375/219 |
| 2010/0293210 A1 | 11/2010 | Sima et al. | |
| 2013/0003591 A1* | 1/2013 | Novak | H04W 72/085 370/252 |
| 2013/0266100 A1 | 10/2013 | Gomadam et al. | |
| 2017/0346536 A1* | 11/2017 | Nabar | H04B 7/0617 |

FOREIGN PATENT DOCUMENTS

| | | |
|---|---|---|
| CN | 107615694 | 1/2018 |
| DE | 112015006626 | 3/2018 |
| EP | 2214439 | 8/2010 |
| EP | 3001622 | 3/2016 |
| KR | 102013142344 | 12/2013 |
| TW | I394390 | 4/2013 |
| WO | 2016201647 | 12/2016 |

* cited by examiner $$\overbrace{\begin{bmatrix} m_{11} & m_{12} \\ m_{21} & m_{22} \\ m_{31} & m_{32} \\ m_{41} & m_{42} \\ m_{51} & m_{52} \end{bmatrix}}^{\text{number of user antennas}} \left.\vphantom{\begin{bmatrix} m_{11} \\ m_{21} \\ m_{31} \\ m_{41} \\ m_{51} \end{bmatrix}}\right\} \text{number of servo antennas}$$

FIG. 4A $$\begin{bmatrix} m_{11} & m_{12} \\ m_{21} & m_{22} \\ 0 & 0 \\ 0 & 0 \\ 0 & 0 \end{bmatrix}$$

FIG. 4B $$\begin{bmatrix} 0 & 0 \\ 0 & 0 \\ m_{31} & m_{32} \\ 0 & 0 \\ 0 & 0 \end{bmatrix}$$

FIG. 4C $$\begin{bmatrix} 0 & 0 \\ 0 & 0 \\ 0 & 0 \\ m_{41} & m_{42} \\ m_{51} & m_{52} \end{bmatrix}$$

FIG. 4D

MULTI-ANTENNA NETWORK SYSTEM AND SIGNAL PROCESSING METHOD THEREOF

FIELD OF THE INVENTION

The present invention relates to a multi-antenna network system, and more particularly to a multi-antenna network system, which conducts signal processing by referring to variations of communication channels at different time durations. The present invention also relates to a signal processing method included or applied to the multi-antenna network system.

BACKGROUND OF THE INVENTION

A small-cell base station is one of the hot issues regarding the fifth-generation (5G) wireless system in the network communication industry. Due to the densely distributed requirement with the use of small-cell base stations, the small-cell base stations need to intensively coordinate with one another to avoid mutual interference of signals to and from respective antennas. The intense coordination adversely affects the performance of the network communication. Therefore, in the 5G Ultra-Dense Network (UDN) environment, the cross-station coordination is generally conducted by way of a network multi-input multi-output (network MIMO) system. Accordingly, the interference and deterioration of communication caused by analogous servo antennas as a result of the increase in number of small-cell base stations could be alleviated.

In order to solve the above-mentioned problems, the prior art uses a precoding technology for communication. With the precoding technology, an inverse matrix is obtained. A signal, before being transmitted from a base station via a servo antenna, is previously processed with the inverse matrix. By way of such a previous processing operation, the phases and amplitudes of the signals to be transmitted via multiple antennas are adjusted so that an antenna of a user device, e.g. a mobile phone, can receive the signals as a constructive synthetic wave with an improved intensity.

It is understood that since the precoding operation is a reverse-matrix operation, the operational complexity would be $O(n^3)$, where n is the number of emitting antennas. Taking a 20 MHz time-division duplex (TDD) mode as an example of an uplink-downlink configuration 2 of the 3GPP, the calculation would be executed once per 15 KHz band (i.e. per subcarrier), and up to 720000 precoding operations would be executed per second. Therefore, without improving the precoding technology, there would be problems in increasing the number of collaborative base stations in a Network MIMO system and it would hard to establish a virtual super base station to serve more and more users.

SUMMARY OF THE INVENTION

Therefore, the present invention provides a multi-antenna network system and a signal processing method thereof, which involve lowered reverse-matrix operational complexity so that the number of the collaborative base stations as well as the number of servo antennas can be increased without deteriorating the performance of the system.

In a first aspect of the present invention, a signal processing method for use in a multi-antenna network system is provided. The multi-antenna network system includes a plurality of servo antennas and a plurality of user antennas. A plurality of communication channels are established between the servo antennas and the user antennas. Each of the communication channels transmits signals between one of the servo antennas and one of the user antennas. The signal processing method comprises: realizing a first-time-duration channel reverse matrix derived from a plurality of first-time-duration estimated channel values associated with the servo antennas at a first time duration; realizing a plurality of second-time-duration estimated channel values associated with the servo antennas at a second time duration later than the first time duration, wherein each of the second-time-duration estimated channel values corresponds to one of the communication channels, and different ones of the second-time-duration estimated channel values correspond to different ones of the communication channels; realizing differences between the first-time-duration estimated channel values and the corresponding second-time-duration estimated channel values, wherein the first-time-duration estimated channel values and the corresponding second-time-duration estimated channel values are associated with the same one of the communication channels; using the differences between the first-time-duration estimated channel values and the corresponding second-time-duration estimated channel values and the first-time-duration channel reverse matrix to calculate a second-time-duration channel reverse matrix, which is derived from the second-time-duration estimated channel values; and adjusting signals to be transmitted through the servo antennas based on the second-time-duration channel reverse matrix after the second time duration.

In a second aspect of the present invention, a signal processing method for use in a base station of a multi-antenna network system is provided. The base station includes at least one servo antenna. A communication channel is established between the servo antenna and a user antenna for transmitting signal. The signal processing method comprises: realizing a first-time-duration estimated channel value associated with the communication channel at a first time duration; realizing a second-time-duration estimated channel value associated with the communication channel at a second time duration later than the first time duration; transmitting a difference between the first-time-duration estimated channel value and the second-time-duration estimated channel value to a server; and controlling the servo antenna to adjust a signal to be transmitted according to a parameter feedback by the server after the second time duration.

In a third aspect of the present invention, a signal processing method for use in a server of a multi-antenna network system is provided. The multi-antenna network system includes a plurality of servo antennas. The signal processing method comprises: realizing a first-time-duration channel reverse matrix derived from a plurality of first-time-duration estimated channel values associated with the servo antennas at a first time duration; realizing respective estimated channel-value differences between a plurality of second-time-duration estimated channel values and the plurality of first-time-duration estimated channel values associated with the servo antennas, wherein the plurality of second-time-duration estimated channel values are associated with the servo antennas at a second time duration later than the first time duration, and each of the estimated channel-value differences is a difference between one of the second-time-duration estimated channel values and a corresponding one of the first-time-duration estimated channel values; using the estimated channel-value difference and the first-time-duration channel reverse matrix to calculate a second-time-duration channel reverse matrix; and transmitting the second-time-duration channel reverse matrix to the servo antennas so that the servo antennas adjust signals based on the second-time-duration channel reverse matrix before transmitting the signals.

In a fourth aspect of the present invention, a multi-antenna network system is provided. The multi-antenna network system comprises: a plurality of servo antennas; a plurality of user antennas, each of which has a communication channel with one of the servo antennas for signal transmission; a plurality of base stations, each of which is disposed thereon at least one of the servo antennas; and a server. Each of the base station comprises an uplink wireless signal receiver electrically coupled to the at least one of the servo antennas, and receives an uplink data from each the communication channel associated therewith, wherein each the uplink data includes a corresponding initial channel value, and the uplink wireless signal receiver receives a plurality of entries of first-time-duration uplink data at a first time duration, and a plurality of entries of second-time-duration uplink data at a second time duration later than the first time duration; a channel estimator electrically coupled to the uplink wireless signal receiver for receiving the first-time-duration uplink data and the second-time-duration uplink data from the uplink wireless signal receiver, wherein the channel estimator extracts and operates the initial channel value contained in each entry of the first-time-duration uplink data to obtain a plurality of first-time-duration estimated channel values, and extracts and operates the initial channel value contained in each entry of the second-time-duration uplink data to obtain a plurality of second-time-duration estimated channel values; a difference calculator electrically coupled to the channel estimator for receiving the first-time-duration estimated channel values and the second-time-duration estimated channel values, and calculating and outputting respective differences between the first-time-duration estimated channel values and the corresponding second-time-duration estimated channel values; and a downlink signal generator receiving a plurality of second-time-duration downlink adjusting values, and adjusting an original signal into a downlink signal to be provided for each the corresponding communication channel based on the second-time-duration downlink adjusting values. The server is stored therein a first-time-duration channel reverse matrix derived from the first-time-duration uplink data, wherein the server is electrically coupled to the base stations, receives the differences from the base stations, using the first-time-duration channel reverse matrix and the differences to calculate the second-time-duration downlink adjusting values, and outputs the second-time-duration downlink adjusting values to the downlink signal generator of each the base station.

In a fifth aspect of the present invention, a base station for use in a multi-antenna network system is provided. The base station comprises: at least one servo antenna having a communication channel with a user antenna for signal transmission; an uplink wireless signal receiver electrically coupled to the at least one servo antenna, and receives an uplink data from the communication channel associated with the at least one servo antenna, wherein the uplink data includes a corresponding initial channel value, and the communication channel transmitting therethrough a first-time-duration uplink data at a first time duration, and transmitting therethrough a second-time-duration uplink data at a second time duration later than the first time duration; a channel estimator electrically coupled to the uplink wireless signal receiver for receiving the first-time-duration uplink data and the second-time-duration uplink data from the uplink wireless signal receiver, wherein the channel estimator extracts and operates the initial channel value contained in the first-time-duration uplink data to obtain a first-time-duration estimated channel value, and extracts and operates the initial channel value contained in the second-time-duration uplink data to obtain a second-time-duration estimated channel values; a difference calculator electrically coupled to the channel estimator for receiving the first-time-duration estimated channel value and the second-time-duration estimated channel value, and calculating and outputting difference between the first-time-duration estimated channel value and the corresponding second-time-duration estimated channel value; and a downlink signal generator receiving a second-time-duration downlink adjusting value, and adjusting an original signal into a downlink signal to be provided for the communication channel based on the second-time-duration downlink adjusting value.

In a sixth aspect of the present invention, a server for use in a multi-antenna network system is provided. The multi-antenna network system includes a plurality of servo antennas, and each of the servo antennas has a communication channel with a user antenna for signal transmission. The server comprises: a storage device, a difference-matrix forming device, a calculating device, and an output device.

The storage device stores a first-time-duration channel reverse matrix derived from a plurality of first-time-duration estimated channel values associated with the communication channels at a first time duration. The difference-matrix forming device receives a plurality of difference values between a plurality of second-time-duration estimated channel values associated with the communication channels at a second time duration later than the first time duration and the corresponding first-time-duration estimated channel values, and allocates the difference values into a difference matrix according to a specific rule. The calculating device is electrically coupled to the storage device and the difference-matrix forming device for calculating a second-time-duration channel reverse matrix with the first-time-duration channel reverse matrix realized from the storage device and the difference matrix from the difference-matrix forming device according to a formula (1). The output device is electrically coupled to the calculating device for receiving the second-time-duration channel reverse matrix, and outputting the second-time-duration channel reverse matrix. The formula (1) is presented as the following:

$$(A+BCD)^{-1}=(A)^{-1}-A^{-1}B(C^{-1}+DA^{-1}B)^{-1}+DA^{-1} \qquad (1)$$

where $(A+BCD)^{-1}$ denotes the second-time-duration channel reverse matrix; $(A)^{-1}$ denotes the first-time-duration channel reverse matrix; a product of a matrix B, a matrix C and a matrix D denotes the difference matrix.

BRIEF DESCRIPTION OF THE DRAWINGS

The invention will become more readily apparent to those ordinarily skilled in the art after reviewing the following detailed description and accompanying drawings, in which:

FIG. 4A is a schematic diagram illustrating an example of a channel matrix or a difference matrix when executing a signal processing method according to an embodiment of the present invention;

FIG. 4B is a scheme diagram illustrating an example of the elements associated with a first base station and their positions in the matrix of FIG. 4A;

FIG. 4C is a scheme diagram illustrating an example of the elements associated with a second base station and their positions in the matrix of FIG. 4A;

FIG. 4D is a scheme diagram illustrating an example of the elements associated with a third base station and their positions in the matrix of FIG. 4A.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
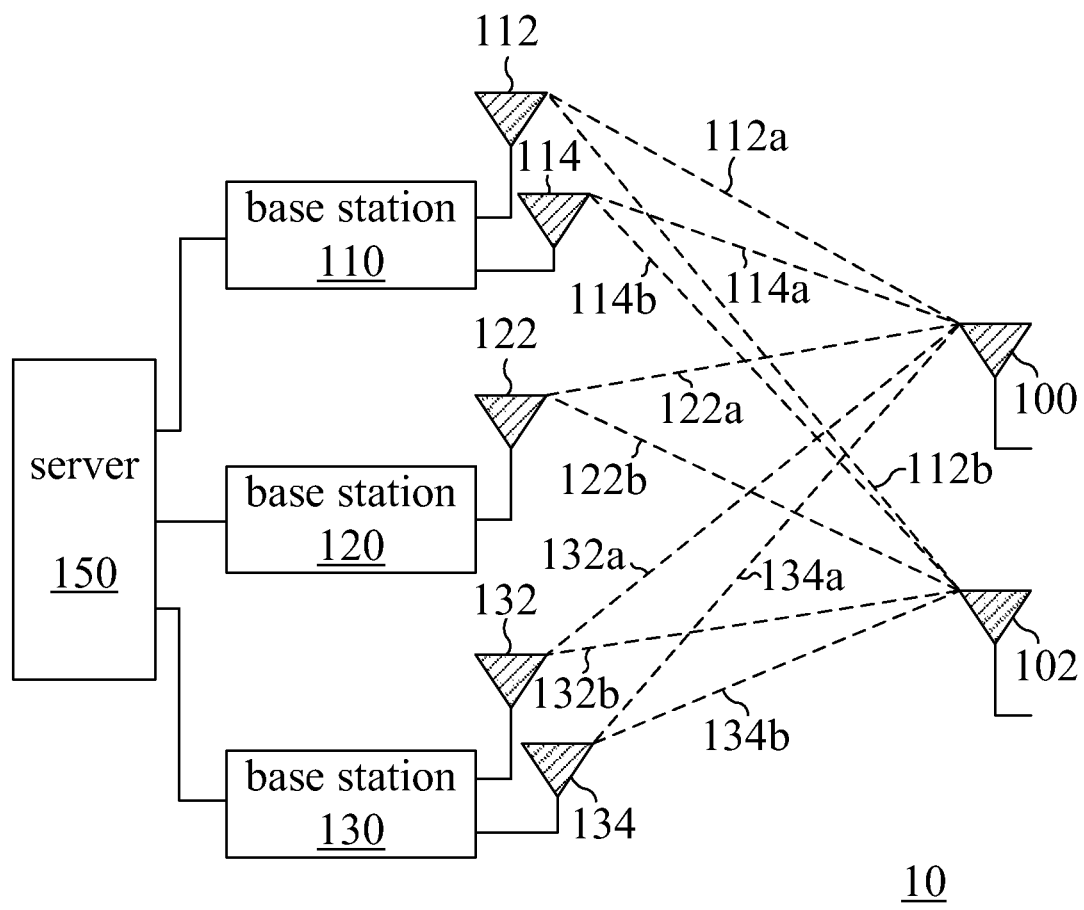
FIG. 1 is a schematic diagram illustrating a multi-antenna network system according to an embodiment of the present invention.

Please refer to FIG. 1. A multi-antenna network system 10 according to an embodiment of the present invention includes at least two user antennas 100 and 102, a plurality of base stations 110, 120 and 130, a plurality of servo antennas 112, 114, 122, 132 and 134 disposed at the base stations, and a server 150, wherein each of the base stations is disposed therein at least one of the servo antennas. As exemplified in the embodiment shown in FIG. 1, the base station 110 is equipped with two servo antennas 112 and 114, the base station 120 is equipped with one servo antenna 122, and the base station 130 is equipped with two servo antennas 132 and 134.

It is understood that in a multi-antenna network system, signals are transmitted between a servo antenna and a user antenna via a communication channel. For example, in the multi-antenna network system 10, a communication channel 112a is used for signal transmission between the servo antenna 112 and the user antenna 100; a communication channel 112b is used for signal transmission between the servo antenna 112 and the user antenna 102; a communication channel 114a is used for signal transmission between the servo antenna 114 and the user antenna 100; a communication channel 114b is used for signal transmission between the servo antenna 114 and the user antenna 102; a communication channel 122a is used for signal transmission between the servo antenna 122 and the user antenna 100; a communication channel 122b is used for signal transmission between the servo antenna 122 and the user antenna 102; a communication channel 132a is used for signal transmission between the servo antenna 132 and the user antenna 100; a communication channel 132b is used for signal transmission between the servo antenna 132 and the user antenna 102; a communication channel 134a is used for signal transmission between the servo antenna 134 and the user antenna 100; and a communication channel 134b is used for signal transmission between the servo antenna 134 and the user antenna 102.

For accurately realizing environmental factors that might affect signal transmission performance of the network system, real-time status of the communication channels associated with each servo antenna of each base station is monitored. Accordingly, the base station 110 monitors the status of the communication channels 112a and 112b associated with the servo antenna 112, as well as the communication channels 114a and 114b associated with the servo antenna 114; the base station 120 monitors the status of the communication channels 122a and 122b associated with the servo antenna 122; and the base station 130 monitors the status of the communication channels 132a and 132b associated with the servo antenna 132, as well as the communication channels 134a and 134b associated with the servo antenna 134. The base stations repetitively measure and determine the status of the communication channel/channels until the corresponding communication channel/channels is/are interrupted.

Take the base station 110 as an example. Assuming the communication channels 112a and 112b are established, the base station 110 measures and determines the status of the communication channels 112a and 112b at a first time duration to obtain respective status data, and then measures and determines the status of the communication channels 112a and 112b again at a second time duration to obtain respective status data, wherein the second time duration is a default period of time after the first time duration. Likewise, the measuring and determining operations are repetitively performed at constant intervals until the communication channels 112a and/or 112b are interrupted. In this way, the base station 110 collects a plurality of communication-channel status data.

The communication-channel status data associated with all the servo antennas 112, 114, 122, 132 and 134 of all the base stations 110, 120, 130 included in the network system 10 are then transmitted to the server 150 to be operated to obtain a reverse matrix. The reverse matrix, in turn, is feedback to the base stations 110, 120 and 130. With the reverse matrix, signals to be transmitted are adjusted before being transmitted out by the base stations 110, 120 and 130 through the communication channels 112a, 112b, 114a, 114b, 122a, 122b, 132a, 132b, 134a and 134b associated with the servo antennas 112, 114, 122, 132 and 134. The adjusted signals are then ready to be outputted.

Figure 2:
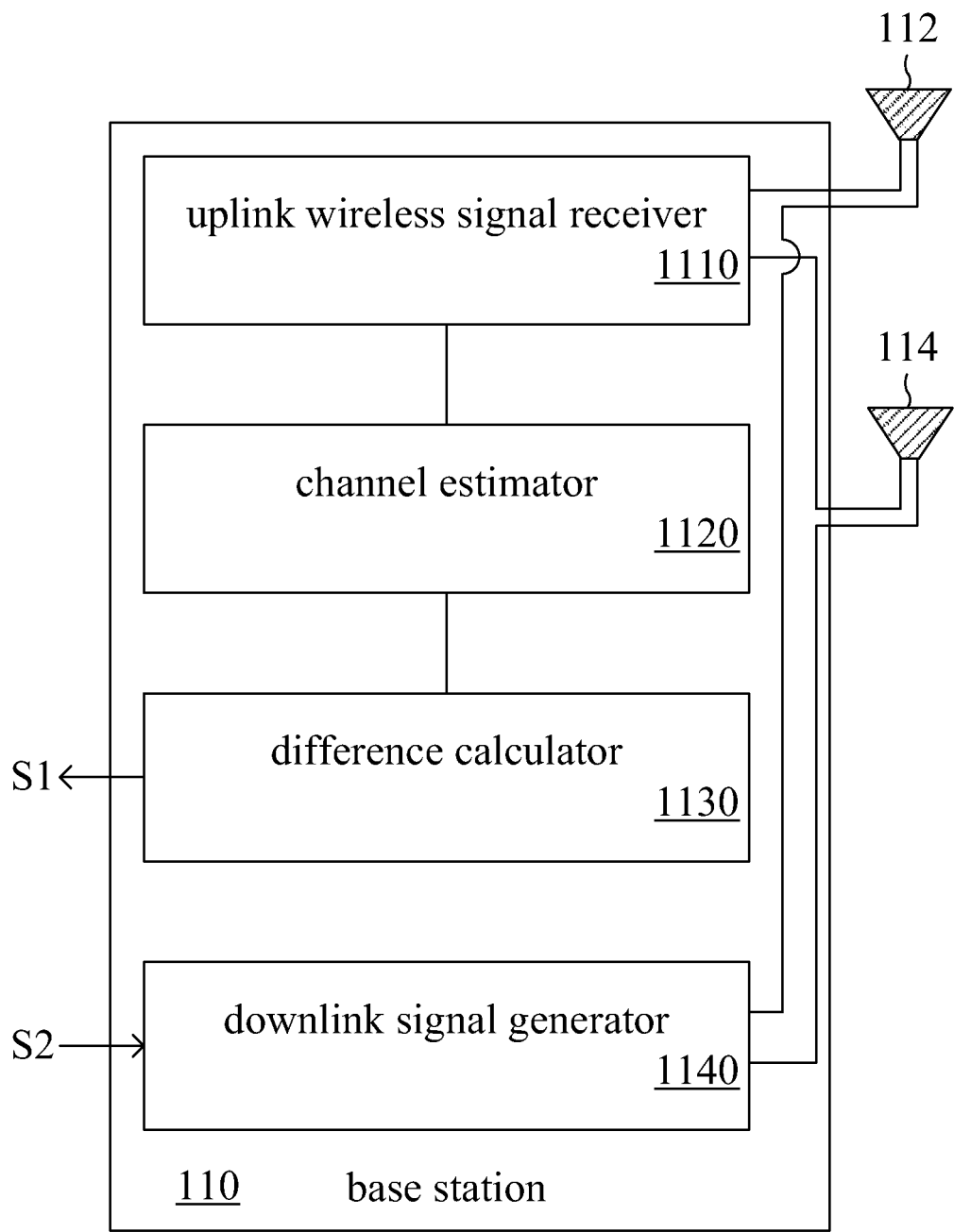
FIG. 2 is a schematic functional block diagram illustrating a base station applicable to the multi-antenna network system as shown in FIG. 1.

Subsequently, the circuitry design and operational principle of a base station in the network system are described with the base station 110 illustrated as an example. Please refer to the circuit block diagram of FIG. 2. As shown, in addition to the servo antenna 112 and the servo antenna 114 as described with reference to FIG. 1, the base station 110 further includes an uplink wireless signal receiver 1110, a channel estimator 1120, a difference calculator 1130, and a downlink signal generator 1140.

In the base station 110, the uplink wireless signal receiver 1110 is electrically coupled to the servo antennas 112 and 114, and receives uplink data, which are transmitted through all the communication channels associated with the servo antennas 112 and 114, e.g. the communication channels 112a, 112b, 114a and 114b as shown in FIG. 1. The uplink data, for example, may include a pilot signal issued from the user antenna. The base station 110 repetitively receives uplink data through each of the communication channels. In other words, at the first time duration, four entries of uplink data are received through the communication channels 112a, 112b, 114a and 114b, respectively, and referred to as first-time-duration uplink data. Likewise, at the second time duration, another four entries of uplink data are received through the communication channels 112a, 112b, 114a and 114b, respectively, and referred to as second-time-duration uplink data. The uplink wireless signal receiver 1110, after receiving the uplink data, transmits the uplink data to the channel estimator 1120 electrically coupled thereto. The channel estimator 1120, after receiving the first-time-duration uplink data, extracts an initial channel value of each communication channel contained in the first-time-duration uplink data, and operates the initial channel value into an estimated channel value, which is referred to as a first-time-duration estimated channel value, by way of estimation or calculation. In practice, the uplink data includes a pilot signal, which inherently contains environmental noises as traveling in a specified communication channel. The channel estimator 1120 isolates and measures such noises to estimate a noise level of this specified communication channel. Based on the pilot signal and the corresponding noise level contained in the uplink data and associated with the specified communication channel, the channel estimator 1120 performs specific estimation and/or calculation and then generates the estimated channel value indicative of a status of the specified communication channel. In this embodiment, the estimated channel value is obtained by estimating the pilot signal and addition information derived from the pilot signal, i.e. the noise level. Therefore, the pilot signal is viewed as the initial channel value inherently contained in the uplink data. Alternatively, both the pilot signal and the noise level derived from the pilot signal may be combined as the initial channel value inherently contained in the uplink data.

Likewise, the channel estimator 1120, after receiving the second-time-duration uplink data, extracts an initial channel value of each communication channel contained in the second-time-duration uplink data, and operates the initial channel value into an estimated channel value, which is referred to as a second-time-duration estimated channel value, by way of estimation or calculation.

The first-time-duration estimated channel value and the second-time-duration estimated channel value from the channel estimator 1120 are then received by the difference calculator 1130 in sequence. Then the difference calculator 1130 calculates the difference between the first-time-duration estimated channel value and the second-time-duration estimated channel value, and outputs the difference value to the server 150. As a plurality of communication channels are involved, the server 150 receives a plurality of difference values S1. Meanwhile, the downlink signal generator 1140 receives a plurality of second-time-duration downlink adjusting values S2 from the server 150. With reference to these second-time-duration downlink adjusting values S2, the original signals to be transmitted are respectively adjusted into downlink signals, and the adjusted downlink signals are provided for the servo antennas 112 and 114 to be transmitted to the corresponding communication channels.

In the above embodiment, the difference calculator 1130 calculates the difference between the first-time-duration estimated channel values and the second-time-duration estimated channel values on channel basis. In other words, each communication channel is individually processed to obtain a difference between its own first-time-duration estimated channel value and its own corresponding second-time-duration estimated channel value. In an alternative embodiment, the first-time-duration estimated channel values may be allocated into a first-time-duration channel matrix according to a specific rule, and the second-time-duration estimated channel values may be allocated into a second-time-duration channel matrix according to the same specific rule. Then the difference between the first-time-duration estimated channel values and the second-time-duration estimated channel values can be realized by way of a subtracting operation of the second-time-duration channel matrix and the first-time-duration channel matrix. Since the difference calculator 1130 performs matrix subtraction of the second-time-duration channel matrix and the first-time-duration channel matrix, the output value S1 of the difference calculator 1130 is presented in a form of matrix.

The above-described specific rule for allocating the estimated channel values may be any suitable rule, e.g. a default order. In addition to the estimated channel values, the base station 110 may acquire other information from the uplink data or from other storage data. The information, for example, include the number of user devices and the number of user antennas of the user devices for each communication channel, the number of communication channels, the noise levels of the communication channels, the physical-layer user identity (ID) of each communication channel, and/or the antenna port ID of each user antenna. Thus the channel estimator 1120 or the difference calculator 1130 may make use of the additional information to determine some parameters of the matrix. For example, a column number of a matrix is set to be the total number of the user antennas, and a row number of the matrix is set to be the total number of servo antennas of the base station and collaborative base stations. In an alternative embodiment, a row number of a matrix is set to be the total number of the user antennas, and a column number of the matrix is set to be the total number of servo antennas of the base station and collaborative base stations. In a further embodiment, the elements associated with the same user antenna or the same servo antenna are arranged at adjacent rows or columns.

Figure 3:
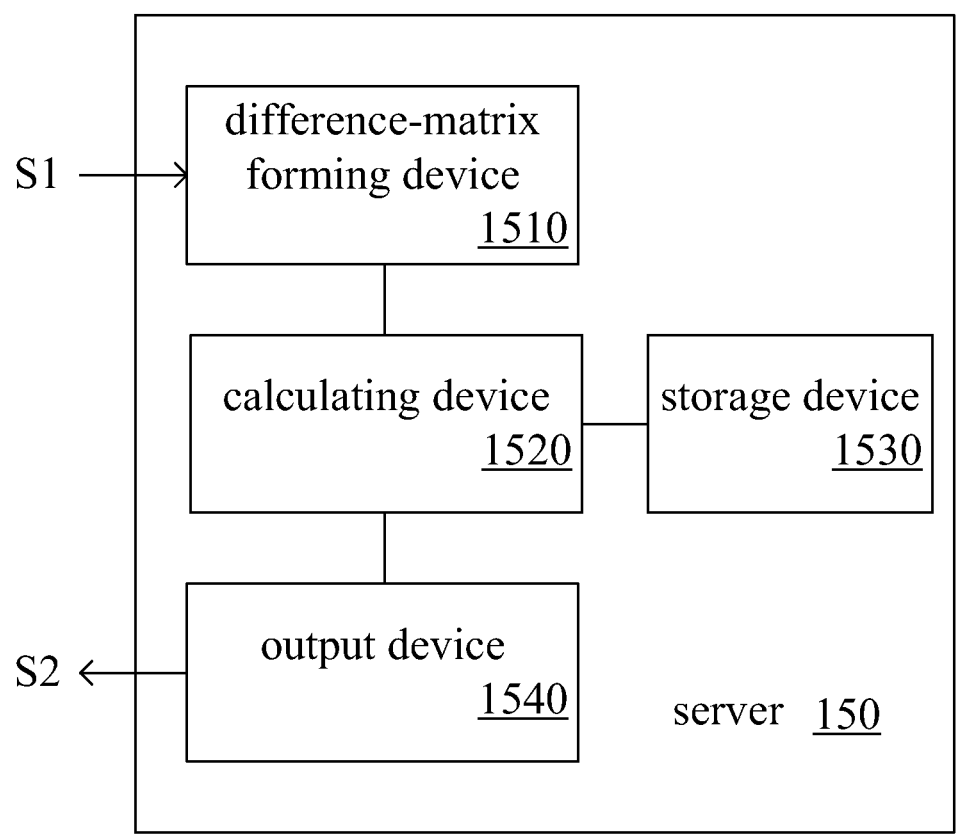
FIG. 3 is a schematic functional block diagram illustrating a server applicable to the multi-antenna network system as shown in FIG. 1.

Subsequently referring to FIG. 3, a circuit block diagram of an embodiment of the server is schematic illustrated. In this embodiment, the server 150 includes a difference-matrix forming device 1510, a calculating device 1520, a storage device 1530 and an output device 1540. The calculating device 1520 is electrically coupled to the difference-matrix forming device 1510, the storage device 1530 and the output device 1540, and data can be transmitted on the electrically coupled paths. The difference-matrix forming device 1510 allocates the difference values S1 received from associated base stations, e.g. the base stations 110, 120 and 130 as shown in FIG. 1, according to the specific rule to form a difference matrix. Even if the difference values S1 are in a form of a matrix, they may still be rearranged by the difference-matrix forming device 1510 to form a difference matrix according to the specific rule.

The details will be described hereinafter with reference to FIG. 4A through FIG. 4D. FIG. 4A illustrates the relative positions of all the elements of a channel matrix or difference matrix. FIG. 4B illustrates the relative positions of the elements associated with the base station 110 in the channel matrix or difference matrix of FIG. 4A. FIG. 4C illustrates the relative positions of the elements associated with the base station 120 in the channel matrix or difference matrix of FIG. 4A. FIG. 4D illustrates the relative positions of the elements associated with the base station 130 in the channel matrix or difference matrix of FIG. 4A. In this embodiment, the number of columns is set to be the number of the user antennas. For example, corresponding to the example as shown in FIG. 1, the number of the user antennas is two, i.e. antennas 100 and 102. On the other hand, the number of rows is set to be the number of the servo antennas. For example, corresponding to the example as shown in FIG. 1, the number of the servo antennas is five, i.e. antennas 112, 114, 122, 132 and 134. In the matrix, the element $m_{11}$ at the position as shown indicates data associated with the communication channel 112a, i.e. the communication channel between the servo antenna 112 and the user antenna 100; the element $m_{12}$ at the position as shown indicates data associated with the communication channel 112b, i.e. the communication channel between the servo antenna 112 and the user antenna 102; the element $m_{21}$ at the position as shown indicates data associated with the communication channel 114a, i.e. the communication channel between the servo antenna 114 and the user antenna 100; the element $m_{22}$ at the position as shown indicates data associated with the communication channel 114b, i.e. the communication channel between the servo antenna 114 and the user antenna 102; the element $m_{31}$ at the position as shown indicates data associated with the communication channel 122a, i.e. the communication channel between the servo antenna 122 and the user antenna 100; the element $m_{32}$ at the position as shown indicates data associated with the communication channel 122b, i.e. the communication channel between the servo antenna 122 and the user antenna 102; the element $m_{41}$ at the position as shown indicates data associated with the communication channel 132a, i.e. the communication channel between the servo antenna 132 and the user antenna 100; the element $m_{42}$ at the position as shown indicates data associated with the communication channel 132b, i.e. the communication channel between the servo antenna 132 and the user antenna 102; the element $m_{51}$ at the position as shown indicates data associated with the communication channel 134a, i.e. the communication channel between the servo antenna 134 and the user antenna 100; and the element $m_{52}$ at the position as shown indicates data associated with the communication channel 134b, i.e. the communication channel between the servo antenna 134 and the user antenna 102.

In the channel matrix or difference matrix as shown in FIG. 4B, only the positions indicated with the elements $m_{11}$, $m_{12}$, $m_{21}$ and $m_{22}$ are occupied and the other positions are labelled with "0" as the base station 110 using the channel matrix or outputting the difference matrix to the server 150 involves only the servo antennas 112 and 114. Likewise, in the channel matrix or difference matrix as shown in FIG. 4C, only the positions indicated with the elements $m_{31}$ and $m_{32}$ are occupied and the other positions are labelled with "0" as the base station 120 using the channel matrix or outputting the difference matrix to the server 150 involves only the servo antenna 122. In the channel matrix or difference matrix as shown in FIG. 4D, only the positions indicated with the elements $m_{41}$, $m_{42}$, $m_{51}$ and $m_{52}$ are occupied and the other positions are labelled with "0" as the base station 130 using the channel matrix or outputting the difference matrix to the server 150 involves only the servo antennas 132 and 134. The matrices as shown in FIG. 4B-4D can be combined into the matrix as shown in FIG. 4A by the difference-matrix forming device 1510 for subsequent use.

Of course, the difference value, in addition to the above-described matrix format, may alternatively be outputted by the base station with only non-zero elements and positions of the non-zero elements. Then the difference-matrix forming device 1510 builds up a complete difference matrix by using the acquired information and the specific rule to allocate the elements and positions.

It is thus understood from the above descriptions that in a multi-antenna network system including more than one base stations, each base station provides partial elements of the channel matrix or partial elements of the difference matrix to be combined and allocated into a complete channel matrix or difference matrix by the difference-matrix forming device 1510.

After the difference-matrix forming device 1510 generates the difference matrix, the difference matrix is transmitted to the calculating device 1520 electrically coupled to the difference-matrix forming device 1510. In addition to the difference matrix acquired from the difference-matrix forming device 1510, the calculating device 1520 further acquires a matrix reverse to the first-time-duration channel matrix, which is referred to a first-time-duration channel reverse matrix, from the storage device 1530 electrically coupled to the calculating device 1520. Then the calculating device 1520 calculates a matrix reverse to the second-time-duration channel, which is referred to as a second-time-duration channel reverse matrix, according to the first-time-duration channel reverse matrix and the difference matrix.

In this embodiment, the calculating device 1520 calculates the second-time-duration channel reverse matrix with the following formula:

$$(A+BCD)^{-1}=(A)^{-1}-A^{-1}B(C^{-1}+DA^{-1}B)^{-1}DA^{-1} \qquad (1)$$

where A denotes the first-time-duration channel matrix, which is formed with status values of all the communication channels allocated according to the specific rule; $(A)^{-1}$ denotes the first-time-duration channel reverse matrix; BCD denotes a product of matrices B, C and D, which forms the complete difference matrix; (A+BCD) denotes a sum of the first-time-duration channel matrix and the difference matrix, which equals to the second-time-duration channel matrix; and $(A+BCD)^{-1}$ denotes the second-time-duration channel reverse matrix to be calculated by the calculating device 1520.

For calculating the second-time-duration channel reverse matrix, the difference matrix should be decomposed into three sub-matrices B, C and D, whose product is equal to the difference matrix. The decomposing operation may be implemented with any suitable one of the conventional protocols that have been recited in many mathematic theses and literatures, and is not to be redundantly described herein. After the matrices B, C and D are realized from the difference matrix, the other elements in the formula (1), e.g. $(C^{-1}+DA^{-1}B)$ and $A^{-1}B(C^{-1}+DA^{-1}B)^{-1}DA^{-1}$, can be calculated with the matrix B, the matrix C, the matrix D and the first-time-duration channel reverse matrix $(A)^{-1}$.

Since the first-time-duration channel reverse matrix $(A)^{-1}$ is directly accessed from the storage device 1530, it does not take any calculation time. On the other hand, the calculation of the other elements in the formula (1) may involve different levels of complexity, depending on the number of columns and rows including non-zero elements in the difference matrix. Assuming the multi-antenna network system includes n servo antennas, the operational complexity of a direct reverse-matrix operation on the communication channels is generally $O(n^3)$. In contrast, if the reverse-matrix operation is performed by using the difference matrix described above and the previously realized reverse matrix to calculate the second-time-duration channel reverse matrix, the operational complexity can be reduced to $O(k^3)$, where k denotes the number of columns and rows including non-zero elements in the difference matrix. In other words, even if the estimated channel values of all the communication channels change between the first time duration and the second time duration, the operational complexity of the present method would be $O(n^3)$ in the worst case and would not be worse than the prior art. As a matter of fact, only some of the estimated channel values of the communication channels would change in general cases, so the number k of columns and rows including non-zero elements in the difference matrix is supposed to be less than n. Accordingly, the operational complexity $O(k^3)$ of the current reverse-matrix operation performed with the difference matrix and the previously realized reverse matrix is much lower than the operational complexity $O(n^3)$ of the direct reverse-matrix operation on the communication channels.

In a practical example, it takes 1 millisecond for the prior art to process a 32*32 matrix by way of the direct reverse-matrix operation. In contrast, using the above-described reverse-matrix operation according to the present invention, a 64*64 matrix could be processed in 1 millisecond, where k=32. It is apparent that the present method significantly improves the performance of the multi-antenna network system, and thus meets the requirement of increasing servo antennas.

Refer to FIG. 3 again. After the calculating device 1520 finishes calculating the second-time-duration channel reverse matrix, the second-time-duration channel reverse matrix is provided to the storage device 1530 and the output device 1540. The second-time-duration channel reverse matrix is stored in the storage device 1530 in place of the previously stored first-time-duration channel reverse matrix. Alternatively, the second-time-duration channel reverse matrix may also be stored into the storage device 1530 together with the first-time-duration channel reverse matrix, depending on the specification and design of the storage device 1530. In the latter case, it is necessary to label the second-time-duration channel reverse matrix as the one to be accessed for calculating next channel reverse matrix. The output device 1540, after receiving the second-time-duration channel reverse matrix from the calculating device 1520, outputs the second-time-duration channel reverse matrix to the associated base stations. The second-time-duration channel reverse matrix is then provided for the downlink signal generator 1140 to serve as the second-time-duration downlink adjusting value S2.

Figure 5:
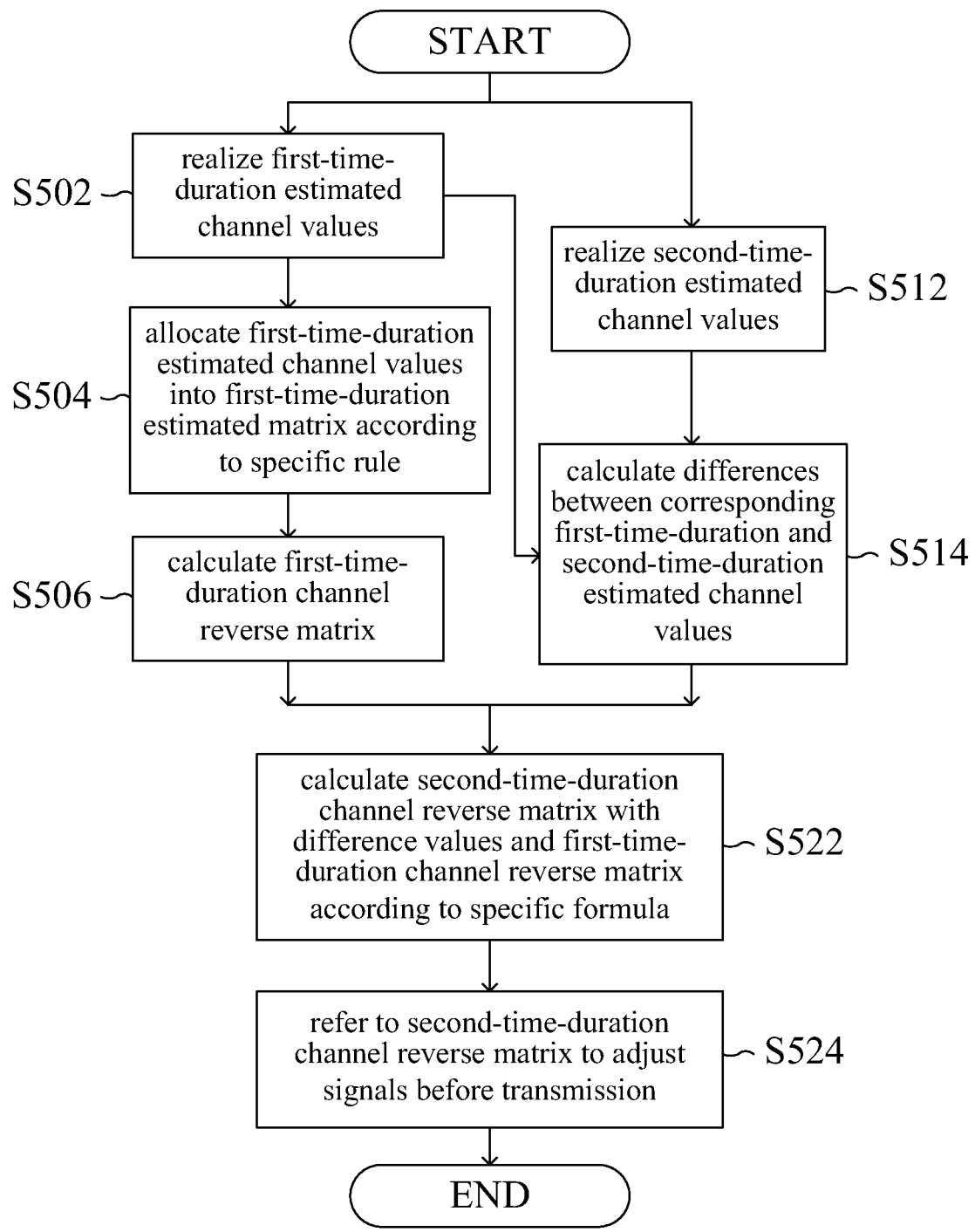
FIG. 5 is a schematic flowchart illustrating a signal processing method according to an embodiment of the present invention.

Please refer to FIG. 5, which schematically illustrates a signal processing method adapted to be used with a multi-antenna network system, e.g. the above-described ones. In the signal processing method as shown in FIG. 5, a plurality of first-time-duration estimated channel values are realized in Step S502. Each of the first-time-duration estimated channel values exclusively corresponds to one communication channel, and different first-time-duration estimated channel values correspond to different communication channels. The first-time-duration estimated channel values are then allocated into a first-time-duration estimated matrix according to a specific rule, which may be the specific order as described in the above embodiments (Step S504). Subsequently, a first-time-duration channel reverse matrix is calculated, e.g. in the above-described way (Step S506).

Meanwhile, a step S512 of the signal processing method is executed to realize a plurality of second-time-duration estimated channel values. Likewise, each of the second-time-duration estimated channel values exclusively corresponds to one communication channel, and different second-time-duration estimated channel values correspond to different communication channels. The first-time-duration estimated channel values acquired in the Step S502 and the second-time-duration estimated channel values acquired in the Step S512 are then operated in Step S514 to calculate respective differences between the first-time-duration estimated channel values and the corresponding second-time-duration estimated channel values. It is to be noted that the correspondence of a second-time-duration estimated channel value to a specific first-time-duration estimated channel value means that these two estimated channel values are associated with the same communication channel.

Afterwards, the difference values realized in Step S514 and the first-time-duration channel reverse matrix obtained in Step S506 are used to calculate the second-time-duration channel reverse matrix according to a specific formula, e.g. the above-described formula (1), in Step S522. Then the second-time-duration channel reverse matrix can be referred to by the servo antennas to adjust the signals before transmission (Step S524).

In this embodiment, Steps S502, S512, S514 and S524 are executed by the base station; Step S504 may be executed by either the base station or the server; and Steps S506, S514 and S522 are executed by the server.

As described above, according to the present invention, the channel reverse matrix at a later time duration, e.g. the second time duration, can be calculated by referring to the channel reverse matrix previously realized at an earlier time duration, e.g. the first time duration, and a difference between the two channel matrices. In this way, the level of the operational complexity can be lowered. As for the very first channel reverse matrix to be referred after the system is initialized, it may be preset to be a zero matrix and serve as the earlier-time-duration channel reverse matrix to proceed calculation. Alternatively, a conventional direct reverse-matrix operation can be executed first to obtain the first earlier-time-duration channel reverse matrix for subsequent calculation based on the present invention.

To sum up, the operational complexity according to the present invention can be lowered because only the data of the communication channels that change between two sequential time durations are used as the elements for calculating the reverse matrix. Provided that the computational speed remains unchanged, a multi-antenna network system operating with the present method would allow more antennas to smoothly work together, compared with the prior art. An improved multi-antenna network system can thus be provided according to the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, in spite hardware devices are exemplified as above in order to practice the redundancy power supply system and the power control circuit according to the present invention, hardware/software hybrid modules or firmware designs may also adopted as alternatives of the devices when appropriate.

What is claimed is:

1. A signal processing method for use in a multi-antenna network system, the multi-antenna network system including a plurality of servo antennas and a plurality of user antennas, a plurality of communication channels being established between the servo antennas and the user antennas, each of the communication channels transmitting signals between one of the servo antennas and one of the user antennas, and the signal processing method comprising:

realizing a first-time-duration channel reverse matrix derived from a plurality of first-time-duration estimated channel values associated with the servo antennas at a first time duration;

realizing a plurality of second-time-duration estimated channel values associated with the servo antennas at a second time duration later than the first time duration, wherein each of the second-time-duration estimated channel values corresponds to one of the communication channels, and different ones of the second-timeduration estimated channel values correspond to different ones of the communication channels;

realizing differences between the first-time-duration estimated channel values and the corresponding second-time-duration estimated channel values, wherein the first-time-duration estimated channel values and the corresponding second-time-duration estimated channel values are associated with the same one of the communication channels;

using the differences between the first-time-duration estimated channel values and the corresponding second-time-duration estimated channel values and the first-time-duration channel reverse matrix to calculate a second-time-duration channel reverse matrix, which is derived from the second-time-duration estimated channel values; and adjusting signals to be transmitted through the servo antennas based on the second-time-duration channel reverse matrix after the second time duration.

2. The signal processing method according to claim 1, wherein the first-time-duration channel reverse matrix are derived from the first-time-duration estimated channel values by allocating the first-time-duration estimated channel values into a first-time-duration channel matrix, and calculating the first-time-duration channel reverse matrix based on the first-time-duration channel matrix, wherein each of the first-time-duration estimated channel values corresponds to one of the communication channels, and different ones of the first-time-duration estimated channel values correspond to different ones of the communication channels.

3. The signal processing method according to claim 1, wherein the second-time-duration channel reverse matrix is calculated according to a formula (1):

$$(A+BCD)^{-1}=(A)^{-1}-A^{-1}B(C^{-1}+DA^{-1}B)^{-}+DA^{-1} \qquad (1)$$

where A denotes the first-time-duration channel matrix; $(A)^{-1}$ denotes the first-time-duration channel reverse matrix; $(A+BCD)$ denotes the second-time-duration channel matrix; $(A+BCD)^{-1}$ denotes the second-time-duration channel reverse matrix; BCD denotes a product of a matrix B, a matrix C and a matrix D; and a product of the matrix B, the matrix C and the matrix D denotes a difference matrix derived from the differences between the first-time-duration estimated channel values and the corresponding second-time-duration estimated channel values.

4. A signal processing method for use in a server of a multi-antenna network system, the multi-antenna network system including a plurality of servo antennas, and the signal processing method comprising:

realizing a first-time-duration channel reverse matrix derived from a plurality of first-time-duration estimated channel values associated with the servo antennas at a first time duration;

realizing respective estimated channel-value differences between a plurality of second-time-duration estimated channel values and the plurality of first-time-duration estimated channel values associated with the servo antennas, wherein the plurality of second-time-duration estimated channel values are associated with the servo antennas at a second time duration later than the first time duration, and each of the estimated channel-value differences is a difference between one of the second-time-duration estimated channel values and a corresponding one of the first-time-duration estimated channel values;

using the estimated channel-value difference and the first-time-duration channel reverse matrix to calculate a second-time-duration channel reverse matrix; and transmitting the second-time-duration channel reverse matrix to the servo antennas so that the servo antennas adjust signals based on the second-time-duration channel reverse matrix before transmitting the signals.

5. The signal processing method according to claim 4, wherein the first-time-duration channel reverse matrix are derived from the first-time-duration estimated channel values by allocating the first-time-duration estimated channel values into a first-time-duration channel matrix, and calculating the first-time-duration channel reverse matrix based on the first-time-duration channel matrix.

6. The signal processing method according to claim 4, wherein the second-time-duration channel reverse matrix is calculated according to a formula (1):

$$(A+BCD)^{-1}=(A)^{-1}-A^{-1}B(C^{-1}+DA^{-1}B)^{-}+DA^{-1} \qquad (1)$$

where A denotes the first-time-duration channel matrix; $(A)^{-1}$ denotes the first-time-duration channel reverse matrix; a product of the matrix B, the matrix C and the matrix D denotes a difference matrix derived from the estimated channel-value differences; (A+BCD) denotes the second-time-duration channel matrix; and $(A+BCD)^{-1}$ denotes the second-time-duration channel reverse matrix.

7. A multi-antenna network system, comprising:

a plurality of servo antennas;

a plurality of user antennas, each of which has a communication channel with one of the servo antennas for signal transmission;

a plurality of base stations, each of which is disposed thereon at least one of the servo antennas, and comprises:

an uplink wireless signal receiver electrically coupled to the at least one of the servo antennas, and receives an uplink data from each the communication channel associated therewith, wherein each the uplink data includes a corresponding initial channel value, and the uplink wireless signal receiver receives a plurality of entries of first-time-duration uplink data at a first time duration, and a plurality of entries of second-time-duration uplink data at a second time duration later than the first time duration;

a channel estimator electrically coupled to the uplink wireless signal receiver for receiving the first-time-duration uplink data and the second-time-duration uplink data from the uplink wireless signal receiver, wherein the channel estimator extracts and operates the initial channel value contained in each entry of the first-time-duration uplink data to obtain a plurality of first-time-duration estimated channel values, and extracts and operates the initial channel value contained in each entry of the second-time-duration uplink data to obtain a plurality of second-time-duration estimated channel values;

a difference calculator electrically coupled to the channel estimator for receiving the first-time-duration estimated channel values and the second-time-duration estimated channel values, and calculating and outputting respective differences between the first-time-duration estimated channel values and the corresponding second-time-duration estimated channel values; and a downlink signal generator receiving a plurality of second-time-duration downlink adjusting values, and adjusting an original signal into a downlink signal to be provided for each the corresponding communication channel based on the second-time-duration downlink adjusting values; and a server stored therein a first-time-duration channel reverse matrix derived from the first-time-duration uplink data, wherein the server is electrically coupled to the base stations, receives the differences from the base stations, using the first-time-duration channel reverse matrix and the differences to calculate the second-time-duration downlink adjusting values, and outputs the second-time-duration downlink adjusting values to the downlink signal generator of each the base station.

8. The multi-antenna network system according to claim 7, wherein the difference calculator further outputs the first-time-duration uplink data to the server.

9. The multi-antenna network system according to claim 7, wherein the server includes:

a difference-matrix forming device for allocating values of the differences into a difference matrix according to a specific rule;

a storage device for storing the first-time-duration channel reverse matrix;

a calculating device electrically coupled to the storage device and the difference-matrix forming device for calculating a second-time-duration channel reverse matrix with the first-time-duration channel reverse matrix realized from the storage device and the difference matrix from the difference-matrix forming device according to a formula (1):

$$(A+BCD)^{-1}=(A)^{-1}-A^{-1}B(C^{-1}+DA^{-1}B)^{-}+DA^{-1} \quad (1)$$

Where $(A+BCD)^{-1}$ denotes the second-time-duration channel reverse matrix; $(A)^{-1}$ denotes the first-time-duration channel reverse matrix; a product of a matrix B, a matrix C and a matrix D denotes the difference matrix; and an output device electrically coupled to the calculating device for receiving the second-time-duration channel reverse matrix, and outputting the second-time-duration channel reverse matrix to the base stations as the second-time-duration downlink adjusting values.

10. A base station for use in a multi-antenna network system, comprising:

at least one servo antenna having a communication channel with a user antenna for signal transmission;

an uplink wireless signal receiver electrically coupled to the at least one servo antenna, and receives an uplink data from the communication channel associated with the at least one servo antenna, wherein the uplink data includes a corresponding initial channel value, and the communication channel transmitting therethrough a first-time-duration uplink data at a first time duration, and transmitting therethrough a second-time-duration uplink data at a second time duration later than the first time duration;

a channel estimator electrically coupled to the uplink wireless signal receiver for receiving the first-time-duration uplink data and the second-time-duration uplink data from the uplink wireless signal receiver, wherein the channel estimator extracts and operates the initial channel value contained in the first-time-duration uplink data to obtain a first-time-duration estimated channel value, and extracts and operates the initial channel value contained in the second-time-duration uplink data to obtain a second-time-duration estimated channel values;

a difference calculator electrically coupled to the channel estimator for receiving the first-time-duration estimated channel value and the second-time-duration estimated channel value, and calculating and outputting difference between the first-time-duration estimated channel value and the corresponding second-time-duration estimated channel value; and a downlink signal generator receiving a second-time-duration downlink adjusting value, and adjusting an original signal into a downlink signal to be provided for the communication channel based on the second-time-duration downlink adjusting value.

11. The base station according to claim 10, wherein the difference calculator further outputs the first-time-duration uplink data.

12. A server for use in a multi-antenna network system, the multi-antenna network system including a plurality of servo antennas, each of the servo antennas having a communication channel with a user antenna for signal transmission, and the server comprising:

a storage device for storing a first-time-duration channel reverse matrix derived from a plurality of first-time-duration estimated channel values associated with the communication channels at a first time duration;

a difference-matrix forming device receiving a plurality of difference values between a plurality of second-time-duration estimated channel values associated with the communication channels at a second time duration later than the first time duration and the corresponding first-time-duration estimated channel values, and allocating the difference values into a difference matrix according to a specific rule;

a calculating device electrically coupled to the storage device and the difference-matrix forming device for calculating a second-time-duration channel reverse matrix with the first-time-duration channel reverse matrix realized from the storage device and the difference matrix from the difference-matrix forming device according to a formula (1):

$$(A+BCD)^{-1}=(A)^{-1}-A^{-1}B(C^{-1}+DA^{-1}B)^{-}+DA^{-1} \quad (1)$$

Where $(A+BCD)^{-1}$ denotes the second-time-duration channel reverse matrix; $(A)^{-1}$ denotes the first-time-duration channel reverse matrix; a product of a matrix B, a matrix C and a matrix D denotes the difference matrix; and an output device electrically coupled to the calculating device for receiving the second-time-duration channel reverse matrix, and outputting the second-time-duration channel reverse matrix.

13. The server according to claim 12, wherein the calculating device further decomposes the difference matrix into the matrix B, the matrix C and the matrix D so that a product of the matrix B, the matrix C and the matrix D equals to the difference matrix.

* * * * *